INVENTOR.
DONALD S. CUSHING

April 17, 1962

D. S. CUSHING 3,029,825

DISHWASHING MACHINE AND ELECTRIC CONTROL
CIRCUIT FOR APPLIANCES

Filed April 3, 1961

INVENTOR.
DONALD S. CUSHING

BY Derek P Lawrence

HIS ATTORNEY

United States Patent Office 3,029,825
Patented Apr. 17, 1962

3,029,825
DISHWASHING MACHINE AND ELECTRIC CONTROL CIRCUIT FOR APPLIANCES
Donald S. Cushing, Louisville, Ky., assignor to General Electric Company, a corporation of New York
Filed Apr. 3, 1961, Ser. No. 100,273
4 Claims. (Cl. 134—57)

This invention relates to an electric control circuit, and more particularly to a control circuit wherein an electrically controlled mechanism is made responsive to the loading on an electric motor.

There are many instances in the relatively complex machines run by induction-type electric motors wherein continued loading of the machine is desired until optimum loading for both performance and life of the electric motor is achieved. This occurs, for instance, in dishwashers of the type which have an induction motor for causing a washing action therein. In such machines, it is important to use as much water as possible, but by the same token it is desirable that the amount of water not exceed the maximum load for the motor insofar as performance and life of the motor are concerned.

It is an object of my invention to provide a control circuit whereby operation of a device, such as a water inlet valve, may be provided only up to a certain degree of motor loading.

A further more specific object of my invention is to achieve the aforementioned relationship between motor loading and operation of the device regardless of the voltage variations which may occur in the conventionally provided sources of electric power for domestic use.

A further object of my invention is to provide such a structure in a dishwashing machine wherein the washing action is improved when the maximum permissible amount of water is present to be impelled by a motor driven device.

Briefly stated, in accordance with one aspect of my invention, I provide a circuit for controlling a device in response to the load on an induction-type single-phase motor wherein the main winding and the start winding of the motor are connected in parallel across first and second supply conductors in the usual manner. My invention makes use of the known phenomenon that, in such motors, there is a voltage induced in the start winding means, after it has been disconnected from across the power source, which is substantially inversely proportional to the load on the motor. The connection of the start winding means to one of the conductors is opened by a speed responsive switch as the motor comes up to speed, so that thereafter a first electrical means which is connected across the start winding means may be energized only by the voltage induced in the start winding means. Second electrical means is connected between the conductors in parallel with the motor, and the differential between the voltages across the two electrical means is used to cause a control means to effect or prevent operation of the device to be controlled. More specifically, first and second conditions of the device are provided by the control means when the differential between the voltages is respectively below and above a predetermined level. In this manner, the solenoid controlling the water inlet valve in a dishwasher may be energized until the differential between the voltages increases to a predetermined amount, at which point the solenoid is caused to be de-energized so as to prevent further entry of water to the dishwasher.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

Figure 1:
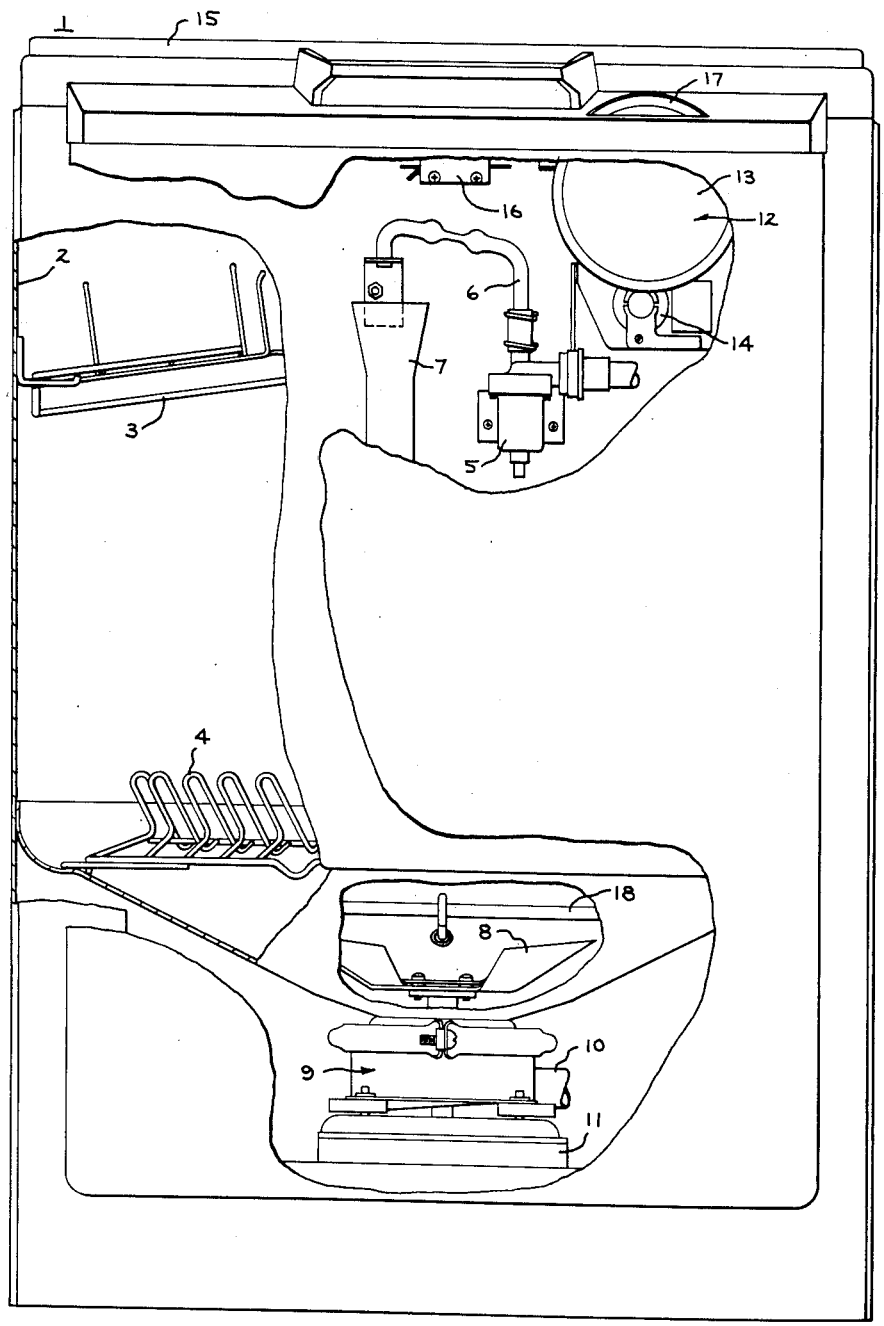
FIGURE 1 is a front elevational view, with some of the parts broken away, of a dishwasher which may advantageously incorporate my invention.

Referring now to FIGURE 1, there is shown a dishwasher 1 having an enclosed washing compartment 2 of generally rectangular configuration in which are mounted an upper rack 3 and a lower rack 4 arranged to support dishes or the like during washing operations. Dishwasher 1 is provided with a water inlet valve 5 adapted to be connected to a water supply system, a water inlet conduit 6, and a fill funnel 7 communicating with the interior of tub 2. Located at the bottom of tub 2 and arranged to circulate washing fluid through the washing compartment is a rotary impeller 8. A drain pump 9 having an inlet communicating with tub 2 and an outlet connected to drain conduit 10 is supported beneath the tub, the housing of pump 9 being arranged to support an electric motor 11 which drives the impeller 8 so as to circulate the fluid in the tub when rotating in one direction, and to operate pump 9 so as to discharge fluid to conduit 10 when driven in the other direction. This washing impeller and drain pump arrangement is the invention of Russell M. Sasnett and Lauren W. Guth and is more fully described in Patent 2,959,179 issued on November 8, 1960 and assigned to the assignee of the present application.

Automatic operation of dishwasher 1 to provide a complete dishwashing and drying cycle is effected by a sequence control assembly, generally indicated by the numeral 12, which is arranged to control the operation of valve 5 and motor 11. The sequence control assembly is also conventionally used to control the actuation at various times of other components of dishwashing machines such as rinse agent dispensers, detergent dispensers, etc., which do not form a part of the present invention and which are therefore not shown and not further mentioned in this application. In the conventional manner, the timer 12 may include a switch actuating rotary cam assembly 13 driven by a constant speed motor 14, such devices being well known in the art. Tub 2 has a top access opening which is closed by a hinged top cover 15 during washing operations, being held in closed position by a latch mechanism 16 of any suitable type such as, for instance, the mechanism disclosed and claimed in Patent 2,896,641, issued on July 28, 1959 to Melvin R. Kauffman and John A. Dicken, Jr., and assigned to the assignee of the present application.

At the front of the machine there may be provided in a conveniently accessible position suitable manually operated means 17 which is used to initiate dishwasher cycles in the conventional manner. Purely for purpose of illustration, it will be understood that the typical full operating cycle of the dishwasher 1 may include a suitable number of rinsing, washing and drying steps; for instance, the cycle may include a preliminary rinse in which the inlet valve 5 is opened and the impeller 8 is rotated by the motor 11 for a short period of time, on the order of two minutes, for instance, to circulate water in the tub; then motor 11 is reversed so as to operate the drain pump 9 and discharge the first charge of washing fluid from the tub, and the inlet valve 5 is shut. This may be followed by a second preliminary rinse on the same order as described immediately above, and a washing step also similar to the first preliminary rinse except that the introduction of water and the circulation thereof by the impeller 8 may continue for a longer period of time. There then follow one, or preferably several, rinse steps similar to the preliminary rinses described; finally, a drying step of predetermined length, in which suitable heating means such as that shown by the numeral 18 is energized to cause evaporation of the moisture on the dishes, may take place.

Figure 2:
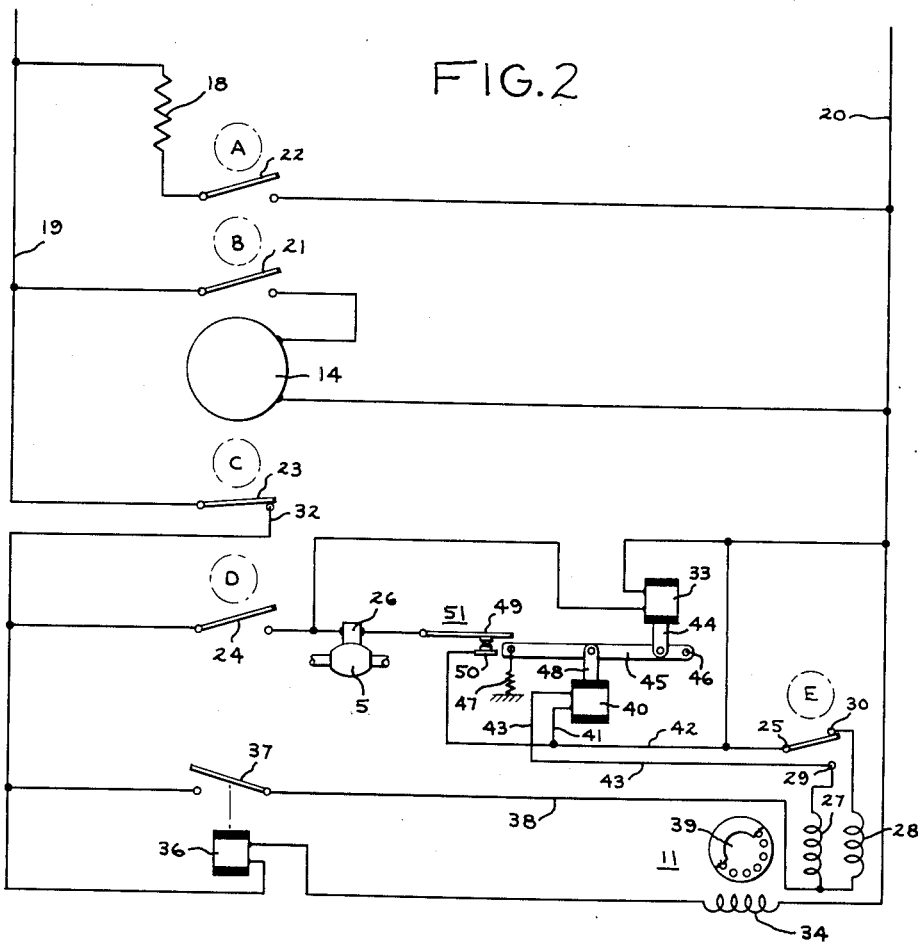
FIGURE 2 is a schematic electric wiring diagram illustrating one embodiment of my control circuit.

Referring now to FIGURE 2, there is shown an embodiment of my improved control circuit as applied to the dishwasher of FIGURE 1. It will be understood that, for purposes of explanation, the circuit is substantially simplified over those commercially provided in dishwashing machines. In this connection, it will be understood that conventionally such circuits may include various safety features, interlocks, and other components such as detergent and rinse agent dispensers which do not form a part of the present invention and therefore are not shown in the circuit.

The electrical elements of dishwasher 1 are energized across a pair of supply conductors 19 and 20 which, in the conventional manner, are adapted to be connected across a suitable source of 110 volt, 60 cycle, alternating current power. The timer motor 14 is connected across the conductors 19 and 20 through a switch 21 controlled by a cam B included in a bank of five cams A, B, C, D, and E which, for purposes of illustration, will be construed to make up the cam assembly 13 in FIGURE 1. It will be understood that, in the conventional manner, the cams may be rotated manually by operation of means 17 to a point where cam B closes switch 21 and that thereafter the energization of the timer motor 14 rotates the cams slowly to cause appropriate opening and closing of the switches to carry the machine through a complete dishwashing and drying sequence. In addition to the switch 21 controlled by cam B, the timer assembly 12 may include switches 22, 23, 24 and 25. Switch 22 is controlled by cam A and is placed in series with heating element 18 so as to control the energization thereof, the switch being closed at the end of a washing operation so as to effect the desired drying operation.

Switch 23 is controlled by cam C and represents the main switch provided for the control of motor 11. Switch 24 is under the control of cam D and is directly in series with a solenoid 26 provided for the control of inlet water valve 5. The last timer control switch 25 is controlled by cam E, and constitutes a motor reversing switch for energizing either one of a pair of oppositely wound motor start windings 27 and 28 which are further discussed herebelow. Arm 25 is engageable with either one of a pair of contacts 29 and 30 for connection thereby to either one of windings 27 and 28.

The switch 23 connects conductor 19 to a conductor 32, so that when the switch 23 is closed, energization of the various components connectable between conductors 32 and 20 is then made possible. These components include a solenoid member 33, connected between the conductors 32 and 20 through switch 24, i.e., in parallel with solenoid 26 and which, as will be explained below, forms an important part of my invention.

In addition, the closure of switch 23 permits motor 11 to be energized across conductors 32 and 20. The motor is of the conventional single phase induction type, and includes a suitable run winding 34 previously mentioned in addition to the start winding means including start windings 27 and 28; main winding 34 is connected in parallel with the start windings and is displaced therefrom in both space and phase. Whichever of the start windings is energized is disconnected when the motor comes up to speed; this may be effected by any suitable speed responsive means, and for purposes of illustration the present structure shows such means as including a relay coil 36 in series with main winding 34 and a switch 37 which, as will be explained herebelow, is in series with both windings 27 and 28. The relay coil 36 and switch 37 operate in a conventional manner, that is, the coil pulls the switch 37 to circuit closing position when a predetermined current level is reached. The predetermined current level is reached only during starting conditions, it being well known that in single-phase induction-type motors the current through the main winding decreases substantially as the motor approaches running conditions compared to that which prevails during starting of the motor.

When switch 25 is in the position shown, the start winding circuit passes from conductor 38 through start winding 28, contact 30, and switch 25 to conductor 20. When the switch 25 is moved to its other position by cam E, the circuit from conductor 38 passes through start winding 27, contact 29, and switch 25 back to conductor 20. In this conventional manner, the polarity of the start winding relative to main winding 34 may be reversed, and it will be understood that, because both start windings are displaced in space and phase from the main winding 34 and are oppositely wound from each other, it effects rotation of the rotor member 39 in one direction for one position of switch 25 and in the other direction for the other position of switch 25. Thus, the switch 25 determines whether the motor 11 will be operative to cause a washing action to take place within the tub 2 of machine 1 or a pumping out action to take place.

A solenoid member 40, whose function will be fully explained herebelow, is connected by conductors 41 and 42 to supply conductor 20 on one side thereof, and by a conductor 43 to contact 29 on the other side thereof. With this arrangement, the solenoid 40 is energizable across conductors 32 and 20 when switch 37 is closed, it being understood that its impedance is substantially higher than that of winding 27 with which it is then in series. However, when switch 37 is open, the solenoid 40 and both start windings 27 and 28 are connected together in a closed loop when switch 25 is in the position shown, which position causes the motor to effect operation of impeller 8. This loop, starting with the solenoid 40, proceeds through conductors 41 and 42, switch 25, contact 30, the start windings 27 and 28, and conductor 43 back to the solenoid 40.

The solenoid 33 has its movable armature 44 secured to a member 45 which is pivotable about a point 46 and which is biased by a spring 47 to a generally downward position. It will be observed that energization of solenoid 33 tends to pull in armature 44 thereby to pull pivoted member 45 upwardly against the action of spring 47. The solenoid 40 similarly has its armature 48 secured to member 45. However, the arrangement is such that solenoid 40 when energized will pull in the opposite direction on member 45 from solenoid 33. In other words, when the energization of solenoid 33 overcomes both the spring 47 and the solenoid 40, the member 45 may be pulled upwardly sufficiently to separate the movable contact 49 from the stationary contact 50 of a switch generally indicated at 51. At all other times, that is, when the force exerted by solenoid 33 does not meet that exerted by spring 47 and solenoid 40, the arm 45 is pulled downwardly and the switch 51 is in its normal or closed position.

Switch 51 is in series relationship to the timer switch 24 and the valve solenoid 26. Thus, for an energizing circuit to be completed through the valve solenoid 26, switches 24 and 51 must both be closed; the circuit then passes from conductor 32 to switch 24, the valve solenoid 26, switch 51, and conductor 42 to conductor 20.

Figure 3:
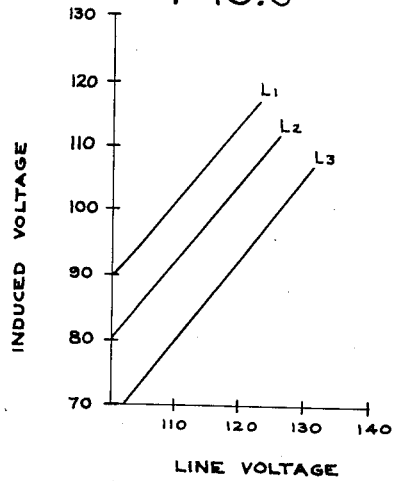
FIGURE 3 is a graph showing the voltage characteristics of an induction single phase motor under different loads illustrating the principle on which my invention is built.
Figure 4:
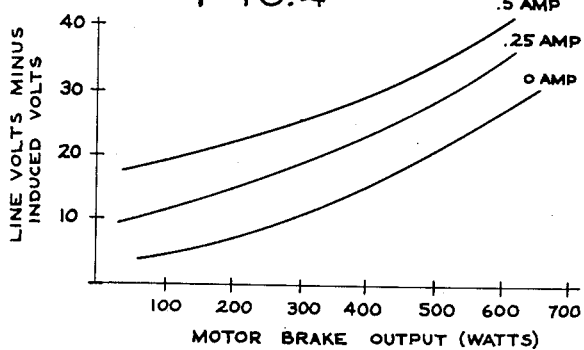
FIGURE 4 is a group of curves showing further motor relationships important to an understanding of my invention.

Prior to explaining the operation of the structure of FIGURE 2 in accordance with my invention, an understanding of the electrical characteristics inherent in a single-phase self-starting induction type motor such as that shown at 11 is important, and is provided by reference to FIGURES 3 and 4. Looking first at FIGURE 3, it relates to the phenomenon of the induction of voltage in the start winding means of motor 11 regardless of the fact that the start winding means is disconnected from the source of power by the switch 37. This voltage in the start winding means results, of course, from the fact that the winding means inherently acts in some respect as the secondary winding of a transformer.

Three different curves are shown for three different load conditions on the motor. Specifically, the curve denoted by the letter $L_1$ shows the relationship of the line voltage across the main winding of the motor to the voltage induced in the start windings of the motor under no load conditions, it being further understood that for purposes of illustration the solenoid 40 represents a .25 ampere load on the start windings at this point. It can readily be seen that there is a direct proportional relationship between the line voltage and the induced voltage, with one increasing directly as the other does so. The curve $L_2$ was obtained with a .25 ampere load again provided by solenoid 40, and represents the relationship of induced voltage to line voltage when the motor has a load of 1.25 ft. lbs. of torque. It can be seen that the increase in load on the motor causes a decrease in the induced voltage; also, most important to my invention, it can further be observed that the difference between the induced voltage and the line voltage is the same regardless of the line voltage. In other words the two straight curves $L_1$ and $L_2$ are substantially parallel, so that the vertical distance between them at any horizontally selected point on the chart is the same.

A third curve $L_3$ shows the condition wherein, with this same .25 ampere load on the start winding, the motor is operating with an output of 2.5 ft. lbs. of torque. Again, it can be seen that the curve is parallel to the other curves so that the difference between the line voltage and the induced voltage remains the same, regardless of what the line voltage is (within the range of voltages normally encountered in domestic use). It can further readily be observed that the induced voltage has again decreased as the load on the motor was increased.

Turning now to FIGURE 4, it can be seen that this difference between the line voltage and the start winding induced voltage, plotted as the ordinate in the figure, bears a definite relationship to the motor output, or load, for any particular component connected across the start windings, three different such components being shown by the current they draw. It will be noted that all three values have the common feature that as the output, or load, increases, the difference between the line voltage and the voltage induced in the start windings also increases, the line voltage remaining constant and the induced voltage decreasing with load as previously explained and shown in FIGURE 3.

With the curves shown in FIGURE 4 it will readily be understood that appropriate voltage responsive means may be provided to take advantage of the differential voltage and provide a controlled condition in response to it. This, in effect, is what has been done by the provision of the two solenoids 33 and 40. Solenoid 33 is connected through switches 23 and 24 across the line and thus receives line voltage. Solenoid 40 is connected across windings 27 and 28 when they are disconnected from the power source by switch 37 and thus is energized by the induced voltage. The upward and downward pulls exerted by the solenoids cause them to act in opposition to each other so that it is the differential voltage between them (or a function of that differential voltage) which provides the total force on member 45 (in addition, of course, to the force resulting from spring 47.)

The solenoids 33 and 40 are so selected that, with motor 11 operating in the direction to provide the washing action, that is, with the switch 25 as shown, and with switch 24 closed by cam D to enable energization of solenoids 26 and 33, the differential voltage remains low enough—that is, the induced voltage is high enough—not to open switch 51 as long as additional water may be introduced through valve 5 without overloading motor 11. When, however, the maximum load for optimum performance and life of the motor has been reached, the force exerted by solenoid 40 and spring 47 decreases to a point where they are no longer sufficient to overcome the force exerted by solenoid 33 as a result of its energization across the line. Consequently, the solenoid 33 lifts up member 45 to open switch 51 thereby de-energizing the water valve solenoid 26.

It can thus be seen that the structure including member 45, the two solenoids 33 and 40 and the switch 51 is in effect a control mechanism operated by the differential voltage between the power source and the potential induced in the start winding means, it being understood that there is a phase difference between the two alternative current voltages that prevents the approach of directly subtracting them electrically. It will further be seen that this structure may be used for controlling the valve 5 and that it has the very substantial advantage that, regardless of the line voltage variations which frequently and unavoidably occur in the power sources provided for domestic purposes, the regulation of the water valve in response to the load on the motor remains unchanged so that the optimum amount of water is always provided.

It will further be seen that a particular differential structure is illustrated as being highly suitable for an alternating current type structure. It will, however, be understood that other differential voltage control means may be provided. For instance, it is obviously possible to take the two voltages (line voltage and induced voltage), rectify them, and then put them in opposition to each other so as to obtain the difference between them. This differential voltage may either control a relay, or directly control a D.C. solenoid.

Also, while reversing in the present case is achieved by provision of two start windings, my invention is obviously applicable in the case where reversing is provided, with a single start winding, by reversing its connections relative to the main winding.

While in accordance with the patent statutes I have described what at present is considered to be the preferred embodiment of my invention, it will be obvious to those skilled in the art that various changes and modifications, in addition to those given above by way of example, may be made without departing from the invention, and I therefore aim in the appended claims to cover all such changes and modifications as fall within the true spirit and scope of my invention.

What I claim as new and desire to secure by Letters Patent of the United States is:

1. A circuit, for controlling a device in response to the load on a motor, comprising: first and second supply conductors; an induction type single phase motor including main winding means and start winding means connected in parallel across said conductors, said start winding means having a voltage induced therein substantially inversely proportional to the load on said motor; a speed responsive switch arranged to open the connection of said start winding means to one of said conductors as said motor comes up to speed; first electrical means connected across said start winding on the same side therewith of said switch thereby to be energized only by the voltage induced in said start winding means when said switch opens said start winding means connection; second electrical means connected between said conductors in parallel with said motor; and control means for the device responsive to the differential between the voltages across said first and second electrical means to provide first and second conditions of the device when said differential between voltages is respectively below and above a predetermined level.

2. A circuit, for controlling a device in response to the load on a motor, comprising: first and second supply conductors; an induction type single phase motor including main winding means and start winding means connected in parallel across said conductors, said start winding means having a voltage induced therein substantially inversely proportional to the load on said motor; a speed responsive switch arranged to open the connection of said start winding means to one of said conductors as said motor comes up to speed; a first solenoid connected across said start winding means on the same side therewith of said switch thereby to be energized only by the voltage induced in said start winding means when said switch opens said start winding means connection; a second solenoid connected between said conductors in parallel with said motor; and movably arranged control means for the device movable between first and second positions, said first solenoid biasing said control means in one direction and said second solenoid biasing said control means in the other direction whereby said control means is responsive to the differential between the voltages energizing said first and second solenoids, said control means moving from said first position to said second position when said differential between voltages reaches a predetermined level.

3. A dishwasher comprising: a tub for receiving dishes and the like; means for introducing water to said tub comprising a valve and a solenoid controlling said valve, said solenoid opening said valve when energized and closing said valve when de-energized; means for circulating water in said tub for effecting a washing action on the dishes; an induction type single phase motor connected to said circulating means in driving relation thereto; first and second supply conductors; said motor including main winding means and start winding means connected in parallel across said conductors, said start winding means having a voltage induced therein substantially inversely proportional to the load on said motor represented by the amount of water being circulated in said tub by said circulating means; a speed responsive switch arranged to open the connection of said start winding means to one of said conductors as said motor comes up to speed; first electrical means connected across said start winding means on the same side therewith of said switch thereby to be energized only by the voltage induced in said start winding means when said switch opens said start winding means; second electrical means connected between said conductors in parallel with said motor; and control means for controlling energization of said valve solenoid, said control means being arranged to be responsive to the differential between the voltages across said first and second electrical means to provide energization of said valve solenoid when said differential between voltages is below a predetermined level and de-energization of said valve solenoid when said predetermined level of differential voltage is reached.

4. A dishwasher comprising: a tub for receiving dishes and the like; means for introducing water to said tub comprising a valve and a valve solenoid controlling said valve to open said valve when it is energized and to close said valve when de-energized; an impeller positioned in said tub for circulating water in said tub to wash dishes therein; an induction type single phase motor connected to said impeller in driving relation thereto; first and second supply conductors; said motor including main winding means and start winding means connected in parallel across said conductors, said start winding means having a voltage induced therein substantially inversely proportional to the load on said motor represented by the amount of water being circulated by said impeller; a speed responsive switch arranged to open the connection of said start winding means to one of said conductors as said motor comes up to speed; a first control solenoid connected across said start winding means on the same side therewith of said switch thereby to be energized only by the voltage induced in said start winding means when said switch opens said start winding means connection; a second control solenoid connected between said conductors in parallel with said motor; a movably mounted control member movable between first and second positions, said first control solenoid being connected to and biasing said control member in toward said first position and said second control solenoid being connected to said control member and biasing it toward said second position when energized; a normally closed second switch enabling energization of said valve solenoid when closed and preventing energization of said valve solenoid when open, said control member moving said second switch to open position when said control member moves to its second position, said control member being moved from its first position to its second position when said differential between the voltages energizing said first and second control solenoids rises to a predetermined level.

References Cited in the file of this patent

UNITED STATES PATENTS

| | | |
|---|---|---|
| 1,991,036 | Werner | Feb. 12, 1935 |
| 1,991,040 | Werner | Feb. 12, 1935 |
| 1,995,318 | Merrill | Mar. 26, 1935 |
| 2,491,643 | Burks | Dec. 20, 1949 |
| 2,771,894 | Low | Nov. 27, 1956 |